United States Patent [19]

Wenzel

[11] Patent Number: 5,461,861

[45] Date of Patent: Oct. 31, 1995

[54] PROCESS FOR COMPRESSING A GASEOUS MEDIUM

[75] Inventor: Harald Wenzel, Kefenrod, Germany

[73] Assignee: Mannesmann Aktiengesellschaft, Dusseldorf, Germany

[21] Appl. No.: 133,679

[22] Filed: Oct. 7, 1993

[30] Foreign Application Priority Data

Oct. 7, 1992 [DE] Germany .......................... 42 34 393.3

[51] Int. Cl.⁶ ............................ F01K 23/10; F04B 17/05
[52] U.S. Cl. ............................................. 60/618; 417/380
[58] Field of Search ............................... 60/618; 417/380, 417/381, 364

[56] References Cited

U.S. PATENT DOCUMENTS 2,849,173 8/1958 Surdy ...................................... 417/380

FOREIGN PATENT DOCUMENTS 701457 1/1941 Germany ................................. 60/618

1441498 6/1976 United Kingdom ................... 417/380

*Primary Examiner*—Michael Koczo
*Attorney, Agent, or Firm*—Cohen, Pontani, Lieberman, Pavane

[57] ABSTRACT

A process for compressing a gaseous medium, particularly air, in which sucked in gas of a lower initial pressure, particularly atmospheric pressure, is compressed to a predetermined final pressure by means of a compressor driven by the useful side of a thermal engine. The sucked in gas is pre-compressed before entering the compressor and/or the compressed gas is re-compressed after exiting the compressor by a turbocharger. The drive side of the turbocharger is acted upon by the energy of the exhaust gas flow of the thermal engine. In order to increase the overall efficiency of transportable compressor installations in particular, a liquid of a closed or open liquid/steam circulation system, which liquid is under pressure, is evaporated and superheated by the exhaust gas flow of the thermal engine and the superheated steam is fed to the drive side of the turbocharger.

12 Claims, 10 Drawing Sheets

PROCESS FOR COMPRESSING A GASEOUS MEDIUM

BACKGROUND OF THE INVENTION

1. Field of the Invention

The invention relates to a process and an apparatus for compressing a gaseous medium, particularly air.

2. Description of the Prior Art

Compressed air is required for the operation of transportable compressed-gas consumers and working equipment such as that used in building construction. In view of an increasingly more responsible attitude toward natural resources, it is advisable particularly for commercial users of large energy consumers to exercise a proportionate savings on energy by improving the efficiency of applied processes and of the machines and installations employed in these processes. Also in the field of compressor technology, sundry attempts have been made to use process-generated exhaust heat within and outside of processes in order to improve the balance of energy and thereby increase overall efficiency.

An arrangement for generating compressed air in which the exhaust gas side of a multi-cylinder reciprocating-piston internal combustion engine is connected to the drive side of an exhaust gas turbocharger is known from DE-OS 29 12 190. The air which is sucked in and compressed by the fresh-air compressor of the exhaust gas turbocharger is fed to the suction side of the internal combustion engine via an intermediate condenser. Downstream of the intermediate condenser, a line connected with the suction side of an air compressor, e.g. a piston compressor, branches off from the charging line leading to the internal combustion engine. The pressure line of the air compressor is connected with the auxiliary units which, in motor vehicles, are supplied with compressed air, e.g. vehicle brakes, air suspension, door openers, etc. This proposed arrangement economizes on an additional air filter for the air compressor and reduces thermal loading of the structural component parts of the air compressor by lowering the final compression temperature.

Furthermore, a process for operating a compressor with a combustion engine for special production of highly-tempered high-pressure gas is known (EP-A-0 248 640) in which the waste heat of the combustion engine is exploited to promote the increase in temperature of the compressed gas. But in spite of the improvement in overall efficiency achieved in this way, this mode of operation is limited only to special applications and cannot be used for conventionally cooled compressed gas.

A multiple-stage compressor is also known in which condensers forming an integral component of a heat pump are provided between the individual compressor stages (DE-OS 31 34 844). In so doing, the compression heat generated in the process is transformed into externally usable heat. Internal use of the heat provided in this way is not indicated. Thus, although the energy balance of the compressor arrangement is improved, external processes are needed to exploit the recovered energy. This form of improving efficiency is not advisable for autonomous transportable compressors.

A compressor installation for generating compressed air is known from an earlier document DE-41 23 208 forming the general prior art, but not published prior to the filing date. In this known installation, a compressor is driven by the useful side of a thermal engine. An exhaust gas turbocharger connected at the exhaust gas side of the thermal engine on the drive side is arranged in the suction and/or pressure line of the compressor. A pressure vessel is arranged in the pressure line and is connected in turn with the consumers via another line.

SUMMARY OF THE INVENTION

Proceeding from compressor systems of the generic type, it is an object of the present invention to provide an improved process for compressing a gaseous medium, in particular air, so as to increase the overall efficiency of mobile compressor systems. By overall efficiency the ratio of the required drive energy to the quantity of compressed gas is meant.

Pursuant to this object, and others which will become apparent hereafter, one aspect of the present invention resides in evaporating a liquid from a closed or open liquid/steam circulation system with the exhaust gas flow of a thermal engine driving a compressor and feeding the steam to the drive side of a turbocharger in the form of a steam turbocharger. In the known process, in which the exhaust gas flow of a thermal engine acts directly on the drive side of an exhaust gas turbocharger, it is chiefly the kinetic energy, rather than the thermal energy contained in the exhaust gas, that is exploited for driving the radial turbines. However, this energy can only be used efficiently when the exhaust gas counterpressure is correspondingly high. This is true particularly when the exhaust gas temperature and the mass flow of the exhaust gas are low. For the thermal engine, however, a high exhaust gas counter-pressure signifies higher push-out work and accordingly higher power losses, which is synonymous with a reduction in the drive output for the compressor. The maximum output of the thermal engine is achieved when the thermal engine pushes out against the lowest possible exhaust gas counterpressure, i.e. against atmospheric pressure. On the other hand, the exhaust gas heat exchanger or evaporator arranged in the liquid/steam circulation system causes only a very low, generally negligible, backup of exhaust gas and beyond this also assumes a sound-damping function. This means that, by means of the suggested process, the gaseous medium to be compressed is advantageously pre-compressed and/or after-compressed or re-compressed by the steam turbocharger without substantial reaction on the thermal engine so that overall efficiency is increased.

The basic process can be varied depending on the concept and design of the installation. For example, the steam flow can be divided and a partial flow can be fed to the drive side of a plurality of turbochargers, preferably two, for the pre-compression and re-compression. The division of the steam flow can be used alternatively or additionally for regulating purposes in that a partial flow is turned on or off as a bypass. A series connection is also possible, whereby the steam flow is fed successively to the drive sides of a plurality of turbochargers.

In another variant the exhaust gas flow is used for intermediate heating after the evaporation of the liquid. For this purpose, the steam flow, after exiting the first steam turbocharger, is guided through a heat exchanger which is likewise acted upon by the exhaust gas flow. Depending on the design of the evaporator and heat exchanger, it may also be advantageous to feed the exhaust gas flow first to the heat exchanger for intermediate heating and then to the evaporator. The known process, in which the exhaust gas flow of a thermal engine acts directly on the drive side of an exhaust gas turbocharger, can be combined with the present process.

For this purpose, the exhaust gas turbocharger is used e.g. as a pre-compression unit and the steam turbocharger is used as a re-compression unit. However, with a view to the preceding statements, it may be advantageous for the exhaust gas flow to act first on the liquid/steam circulation system and then on the drive side of the exhaust gas turbocharger.

In principle, the compressor under discussion may be any type of compressor suitable for the compression of a gas. This includes all compressors with a changeable compression space, e.g. piston compressors and screw-type compressors, but also all compressors operating by a different compression system, e.g. turbocompressors. The thermal engine in question is a reciprocating-piston engine, e.g. a diesel or gasoline engine, or a rotating piston engine or gas turbine of any kind. In particular, the gas to be compressed is air, but can also be any other gaseous medium suitable for compression. Suitable steam turbochargers are particularly those with a radial impeller on the compression side and a tangential impeller on the turbine side, but also all other appropriate types of impellers.

Proceeding from a compressor, known per se, which draws the gas to be compressed through a filter and a suction line and feeds it through a pressure line into a pressure vessel, and which is operated on the useful side by a thermal engine, at least one steam turbocharger is provided. This steam turbocharger is arranged upstream and/or downstream of the compressor, as desired, for pre-compression and/or re-compression and is operated by the exhaust gas of the thermal engine to the extent that the energy content of the exhaust gas is used in that an exchange of energy between the exhaust gas and liquid, preferably water or liquid steam, is effected in a heat exchanger. In a particularly advantageous manner, the gas to be compressed is pre-compressed as well as re-compressed so that the overall efficiency is further improved due to the lower compression ratio of each individual compression stage. The overall efficiency is further increased over and beyond this by installing each heat exchanger as an intermediate condenser between the individual compression stages, since the energy requirement of the compressor installation is reduced by lowering the temperature of the compressed gas. Heat exchangers of any type suitable for cooling a gas, particularly air, are suitable as intermediate condensers. Atmospheric air can be considered as a cooling medium, as can all other media in open and closed systems appropriate for cooling.

The increase in overall efficiency and the division of the overall compression into pre-compression and re-compression can be used to advantage by employing a dry-running engine instead of an oil-flooded screw-type compressor or multiple-vane compressor. In the case of strict requirements regarding the production of compressed air which is free of oil, a high expenditure on apparatus is incurred for the removal of the oil from the compressed air and, even then, there always remains a residual content which, while still in the ppm range, can nevertheless be disruptive for various processes. For this reason, dry-running engines are preferably used for such applications. However, these dry-running engines have the disadvantage that the achievable compression ratio for a single stage is viewed as inadequate because of the limiting of the permissible final temperature.

The inventive process can be used advantageously for all types of compressors, particularly for dry-running engines, since the compression ratio for the main compression unit can be selectively lowered due to the pre-compression and re-compression. This means that, depending on the required compression ratio and final operating pressure, the main compression unit can be provided with fewer compression stages and can accordingly be manufactured at a lower cost.

The various features of novelty which characterize the invention are pointed out with particularity in the claims annexed to and forming a part of the disclosure. For a better understanding of the invention, its operating advantages, and specific objects attained by its use, reference should be had, to the drawing and descriptive matter in which there are illustrated and described preferred embodiments of the invention.

DETAILED DESCRIPTION OF THE PREFERRED EMBODIMENTS

Figure 1:
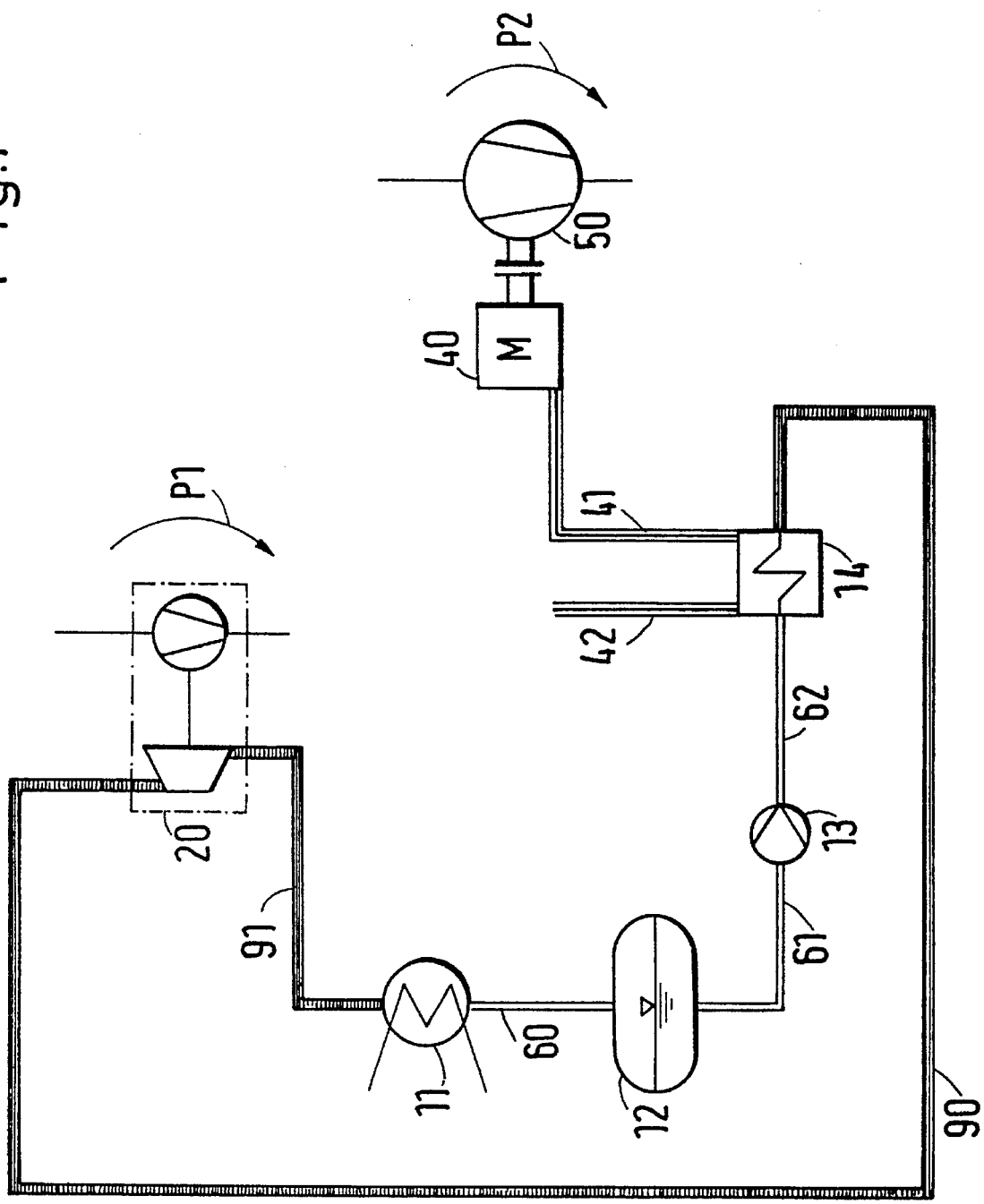
FIG. 1 shows a basic diagram of the process according to the present invention.

The operating diagrams shown schematically in the drawings comprehend only some principle structural groups of a compressor installation and the structural component parts necessary to the invention. All other structural component parts and groups required for the operation of a compressor are not touched upon by the invention and may be included optionally without affecting the substance of the invention.

According to FIG. 1, a compressor 50 is connected to the useful side of a thermal engine 40, known per se. This compressor 50 generates a pressure difference P2 between its input and its output. According to the invention, the exhaust gas side of the thermal engine 40 is connected with an evaporator 14 via an exhaust gas line 41. A liquid, preferably water, is pressed into the evaporator 14 by means of a feed-water pump 13 and a connection line 62. The liquid evaporated in the evaporator 14 by the exhaust gas energy flows through the steam line 90 to the turbine side of the steam turbocharger 20 in the form of steam. The steam is expanded in the turbocharger 20 and flows via the steam line 91 into a condenser 11, where it is condensed. The liquid which is liquified in the condenser arrives in the supply vessel 12 via a connection line 60. The liquid is returned to the feed-water pump 13 via another connection line 60. The compressor part of the steam turbocharger 20 produces a pressure difference P1. This assures that the energy of the thermal engine 40 on the useful side is transformed into the targeted magnitude of pressure difference or compression ratio by means of the compressor 50, and the exhaust gas energy of the thermal engine 40 is transformed into the targeted magnitude of pressure difference or compression ratio by means of the steam turbocharger 20. As a result of a series connection of the compressor stages, the total pressure difference of the compressor installation is the sum of all the pressure differences, in this case P1+P2. The sequence of the compressor stages is not important in principle.

A definable energy which can be determined from the given thermal engine 40 as a constant magnitude is required for generating a predetermined pressure difference in the given compressor arrangement. At a given amount of converted energy in the thermal engine 40, the overall efficiency of the compressor installation is now increased and the occurring waste heat can be made use of internal to the process due to the higher compression ratio.

Figure 2:
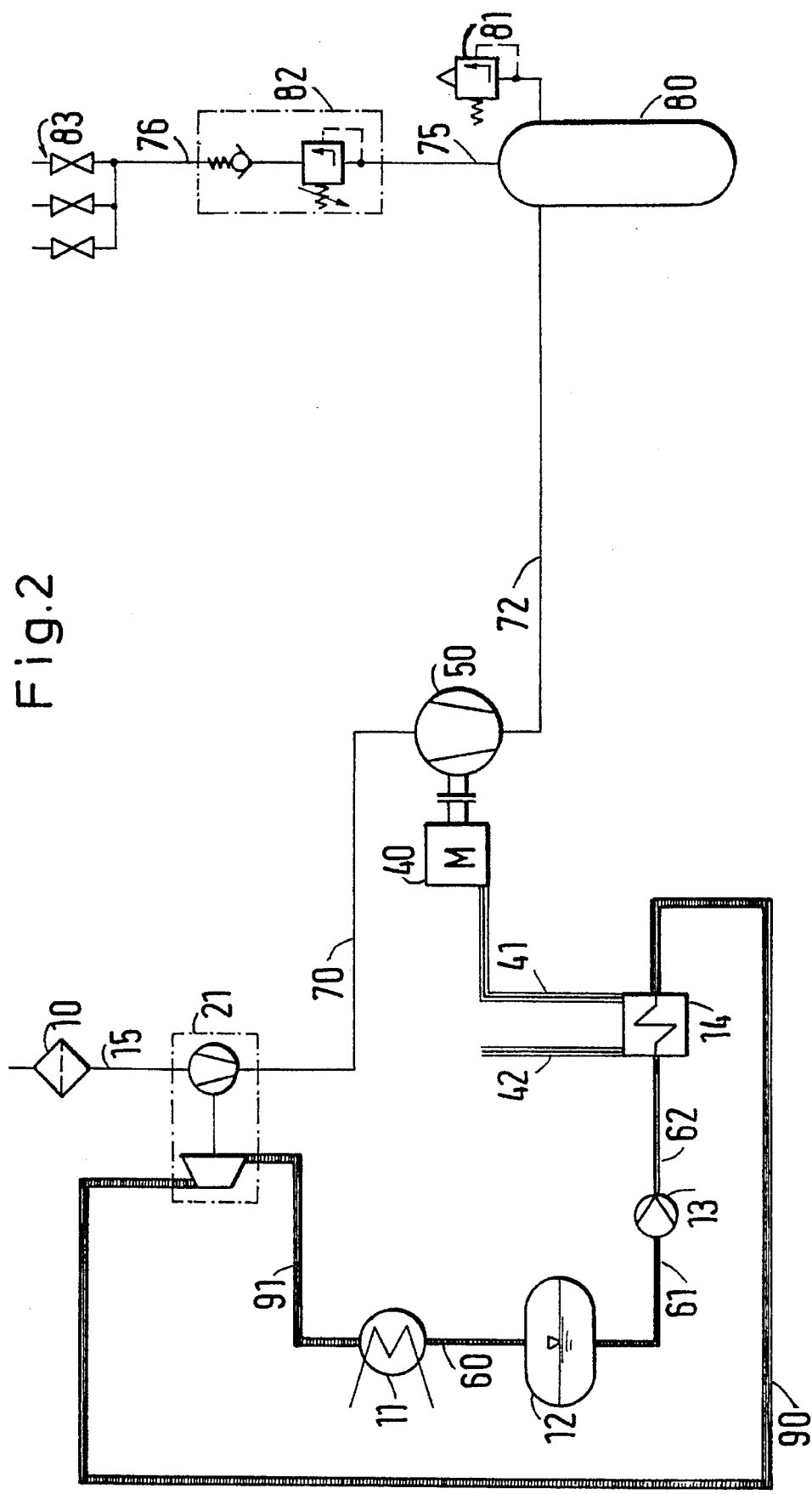
FIG. 2 shows a compressor installation with a steam turbocharger arranged upstream of the compressor.

According to FIG. 2, the gas to be compressed is purified via the filter 10 and sucked in through the suction line 15 of the steam turbocharger 21. The pre-compressed gas is then fed to the compressor 50 through the pressure line 70. The thermal engine 40 serves to drive the compressor 50. The exhaust gas of the thermal engine 40 is fed to the evaporator 14 via the exhaust gas line 41 and is then guided out of the evaporator 14 via the exhaust gas line 42. Water, for example, is pressed into the evaporator 14 by means of the feed-water pump 13 and the connection line 62. The water evaporated in the evaporator 14 by the exhaust gas energy flows through the steam line 90 to the turbine side of the steam turbocharger 21 in the form of water steam. The water steam is expanded in the steam turbocharger 21 and flows via the steam line 91 into the condenser 11 where it is condensed. The water liquified in the condenser arrives in the supply vessel 12 via the connection line 60. The water is returned to the feed-water pump 13 via another connection line 61.

The compressed gas from the compressor 50 reaches a pressure vessel 80 via a pressure line 72. The pressure vessel 80 is monitored by means of a safety valve 81. The compressed gas travels from the pressure vessel 80 through a pressure line 75 via a pressuremaintaining check valve 82 and through a pressure line 76 to removal taps 83.

Figure 3:
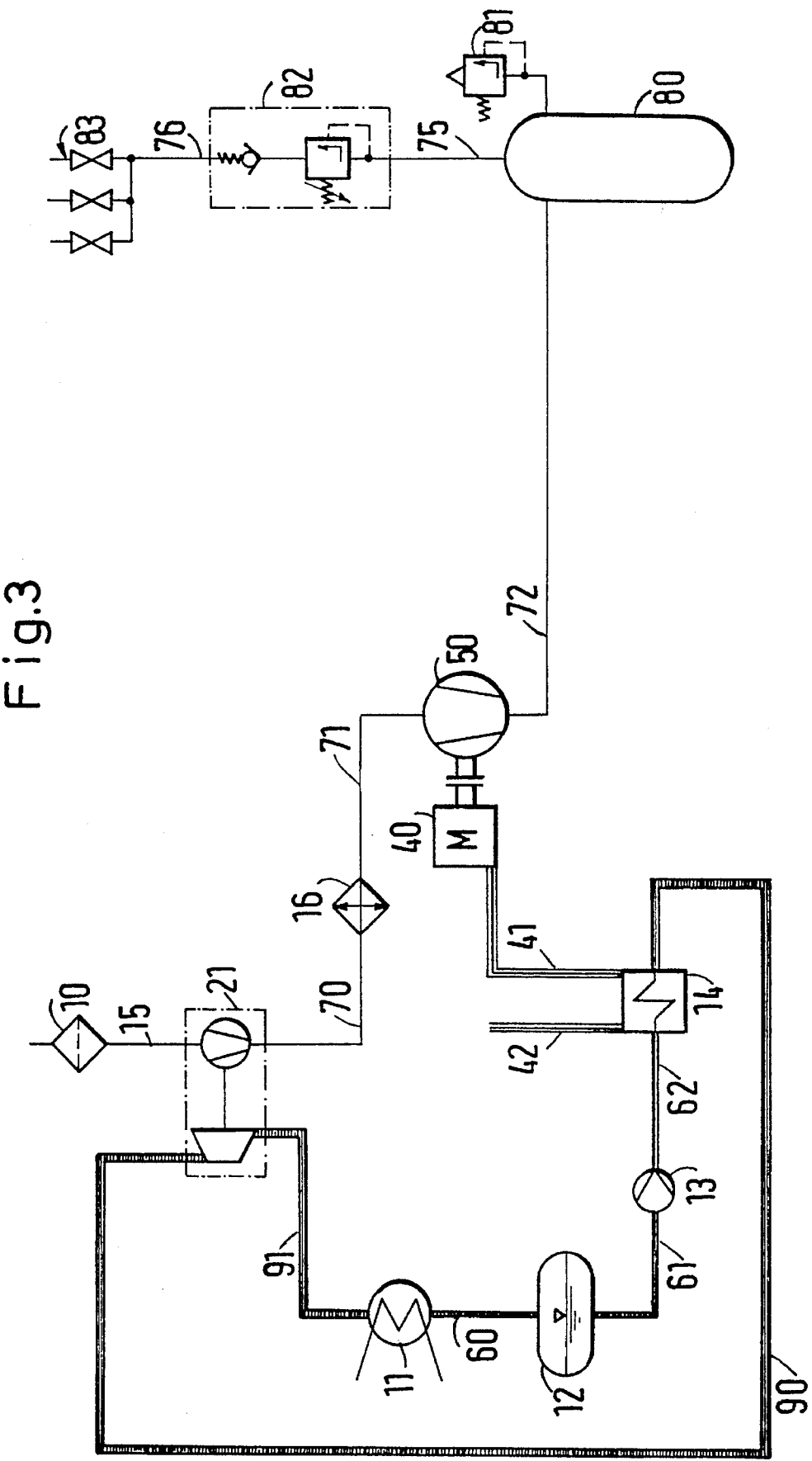
FIG. 3 shows a compressor installation as in FIG. 2, but including an intermediate condenser.

FIG. 3 shows an arrangement similar to the arrangement of FIG. 2, with the exception that an intermediate condenser 16 is provided between the steam turbocharger 21 and the compressor. This intermediate condenser 16 cools the precompressed gas and lowers the power requirement of the compressor installation. A pressure line 71 is provided for connecting the intermediate condenser 16 with the compressor 50.

Figure 4:
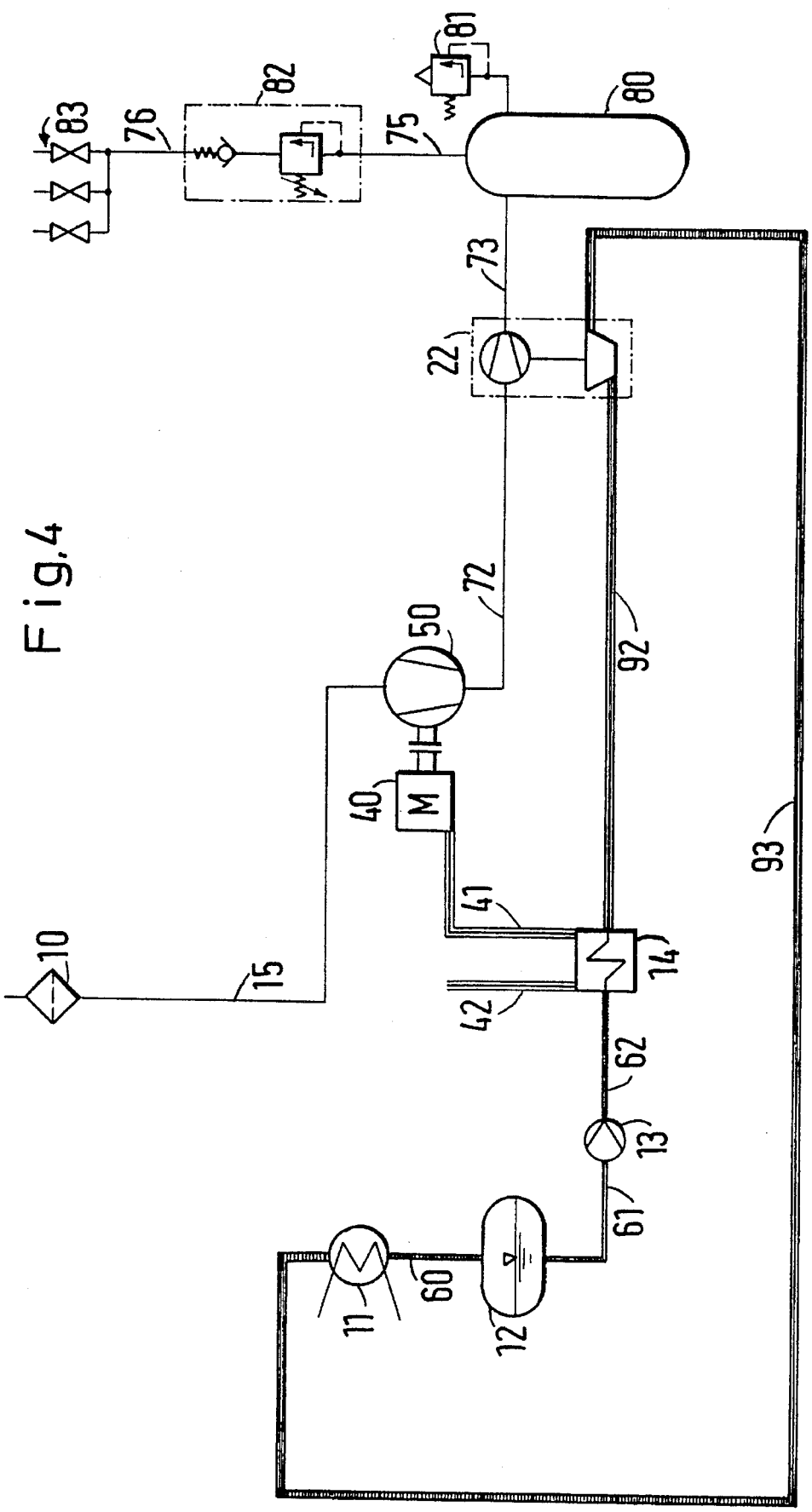
FIG. 4 shows a compressor installation with a steam turbocharger arranged downstream of the compressor.
Figure 5:
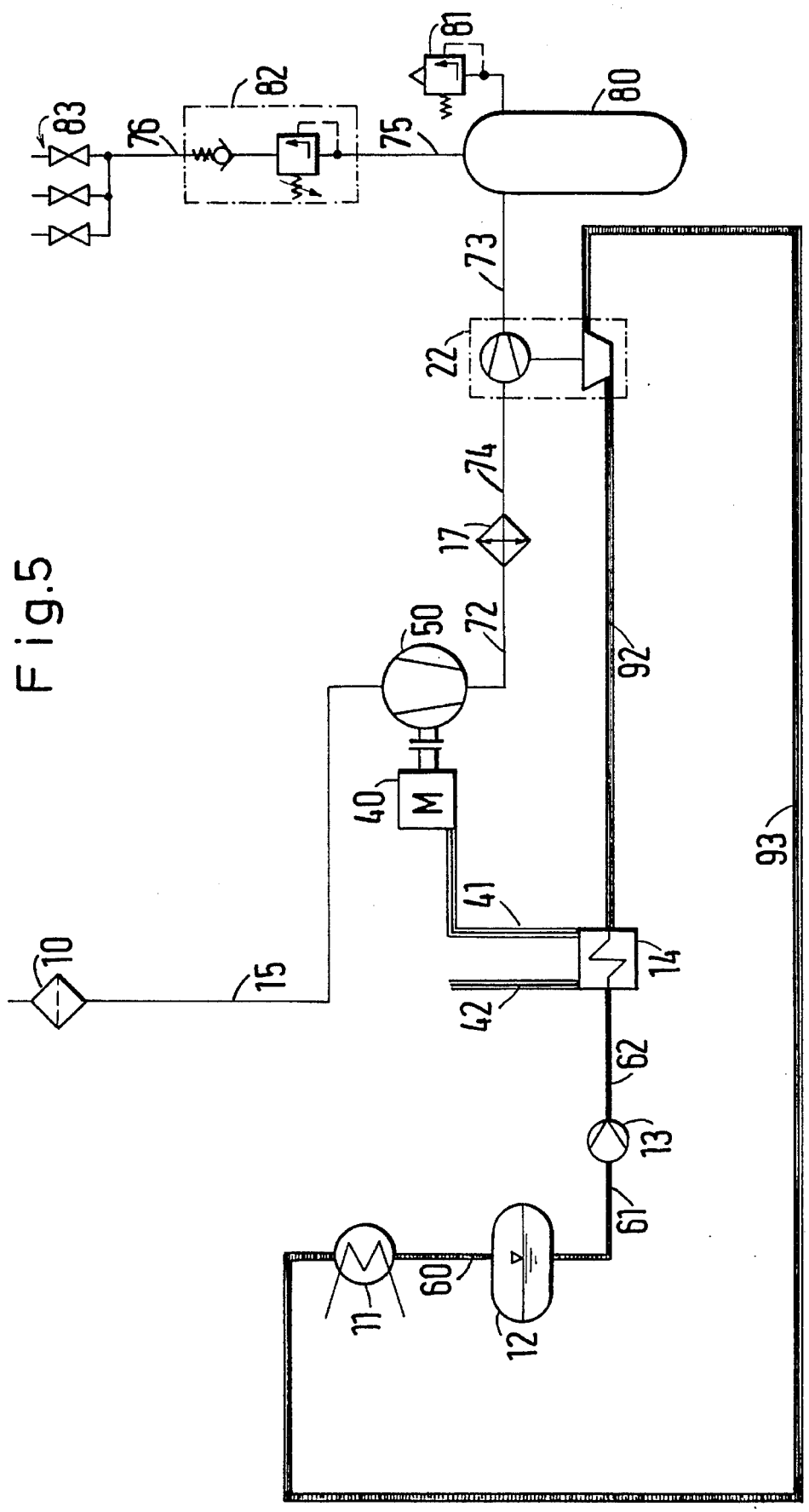
FIG. 5 shows a compressor installation as in FIG. 4, but including an intermediate condenser.

In a further embodiment of the invention according to FIG. 4, a steam turbocharger 22 is arranged downstream of the compressor 50 for re-compression of the gas flowing out of the compressor 50. The thermal engine 40 serves to drive the compressor 50. The exhaust gas of the thermal engine 40 is fed to the evaporator 14 through the exhaust gas line 41 and is then guided off from the evaporator 14 via the exhaust gas line 42. The water evaporated in the evaporator 14 by the exhaust gas energy flows in the form of water steam through the steam line 92 to the turbine side of the steam turbocharger 22. The water steam is expanded in the latter and flows via the steam line 93 into a condenser 11 where it is condensed. The pressure line 73 provides the connection between the steam turbocharger 22 and the pressure vessel 80. By way of addition, an intermediate condenser 17 is provided downstream of the compressor 50 in FIG. 5 so as to reduce the power requirement of the compressor installation in a manner analogous to the arrangement according to FIG. 3. The pressure line 74 is provided for connecting the intermediate condenser 17 with the steam turbocharger 22.

Figure 6:
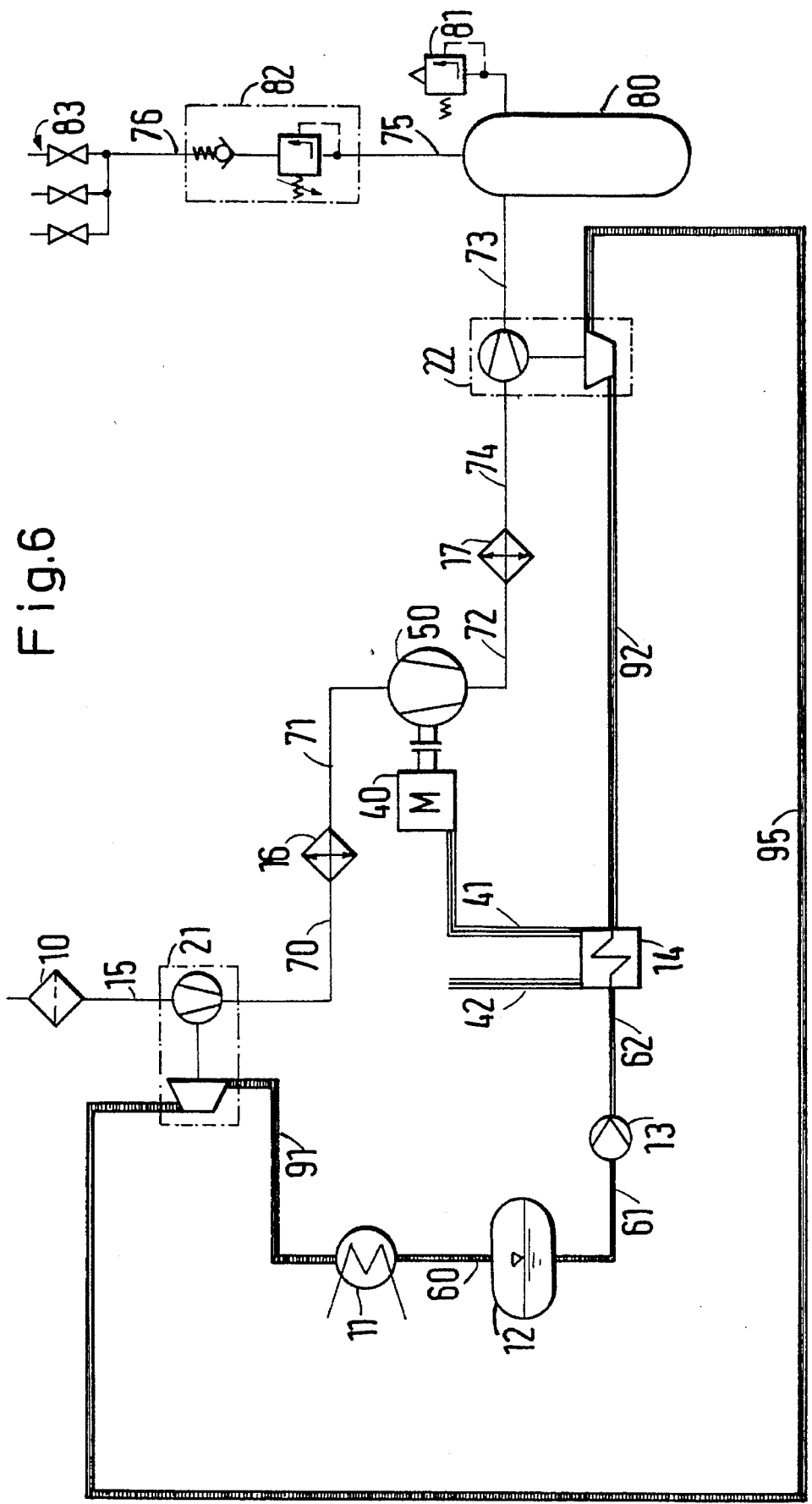
FIG. 6 shows a compressor installation with a steam turbocharger arranged upstream of the compressor and a steam turbocharger arranged downstream of the compressor.

In another embodiment of the invention, a compressor installation is shown in FIG. 6 in which steam turbochargers 21 and 22 are provided respectively upstream and downstream of the compressor 50. In the example shown in the drawing, the turbine side of the re-compressing steam turbocharger 22 is acted upon first via the steam line 92 and then the turbine side of the pre-compressing steam turbocharger 21 is acted upon via the steam line 95. Clearly, the sequence can also be reversed, i.e. the steam line 92 can be connected first with the turbine side of the pre-compressing steam turbocharger 21. It can be seen that, by way of addition, an intermediate condenser 16 is arranged downstream of the first steam turbocharger 21 and an intermediate condenser 17 is arranged downstream of the compressor 50 so as to further reduce the overall power consumption of the compressor. Each of the intermediate condensers 16 and 17 can be provided optionally with a condensation tap.

Figure 7:
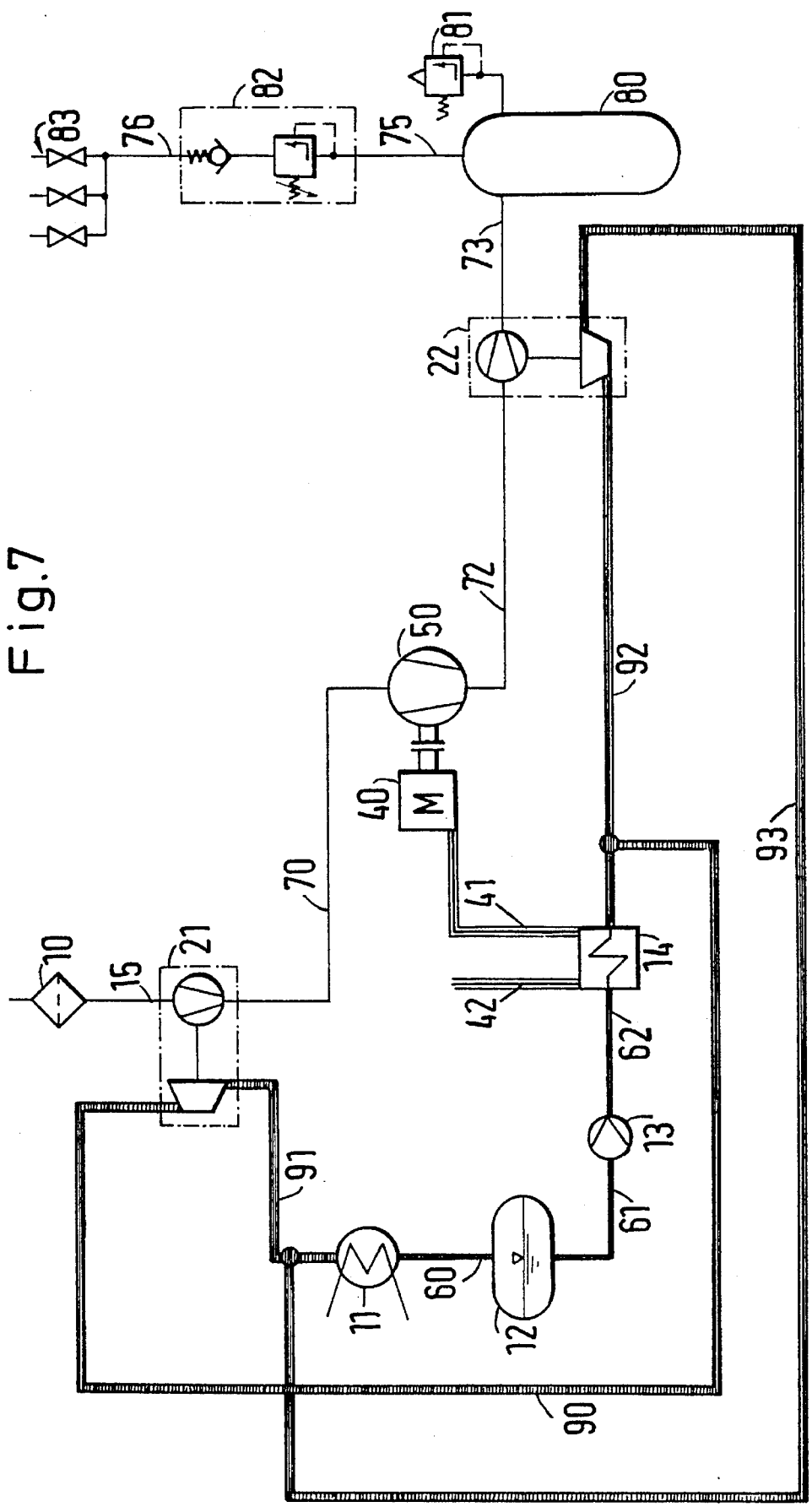
FIG. 7 shows a compressor installation as in FIG. 6, but with a divided steam flow.

FIG. 7 shows an arrangement similar to that in FIG. 6, and only differs in that the steam flow is divided after the evaporator 14. A parallel connection is accordingly provided between the pre-compressing steam turbocharger 21 and the re-compressing steam turbocharger 22. Before entering the condenser 11, the two steam lines 93, 91 leading away from the turbochargers reunite. The idea of dividing the steam flow can also be applied for regulating purposes, e.g. in that the steam line 90 is used as a bypass line which can be turned on and off. In this case, it would not be connected with the turbine side of the pre-compressing steam turbocharger 22, but rather would open out prior to the condenser 11. The advantage of this would ,be that the steam fed to the two steam turbochargers 21, 22 could be regulated depending on requirements, e.g. at partial load.

Figure 8:
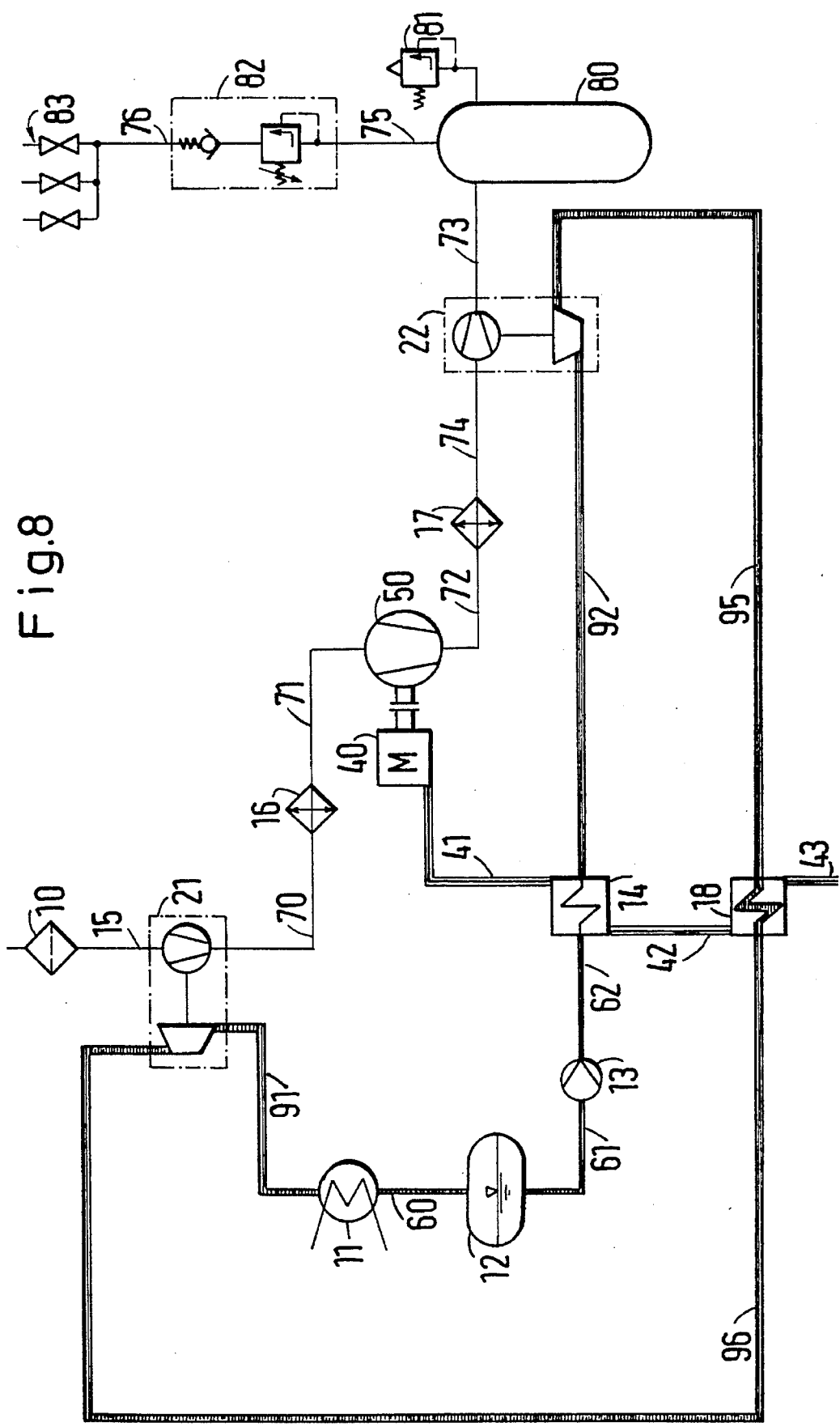
FIG. 8 shows a compressor installation as in FIG. 6, but including an intermediate superheater and two intermediate condensers.

By way of addition to FIG. 6, an intermediate heater 18 is arranged between the two steam turbochargers 21 and 22 in FIG. 8. The exhaust gas of the thermal engine 40 which is partially cooled in the evaporator 14 is fed to the intermediate heater 18 through the exhaust gas line 42 and further cooled. The exhaust gas is then guided off via the exhaust gas line 43. The intermediately heated steam is fed to the steam turbocharger 21 via the steam line 96. The advantage of this construction consists in that steam with a higher temperature and possessing a higher useful energy content can be fed to the steam turbocharger 21 resulting in an increased output in the steam turbocharger 21.

Figure 9:
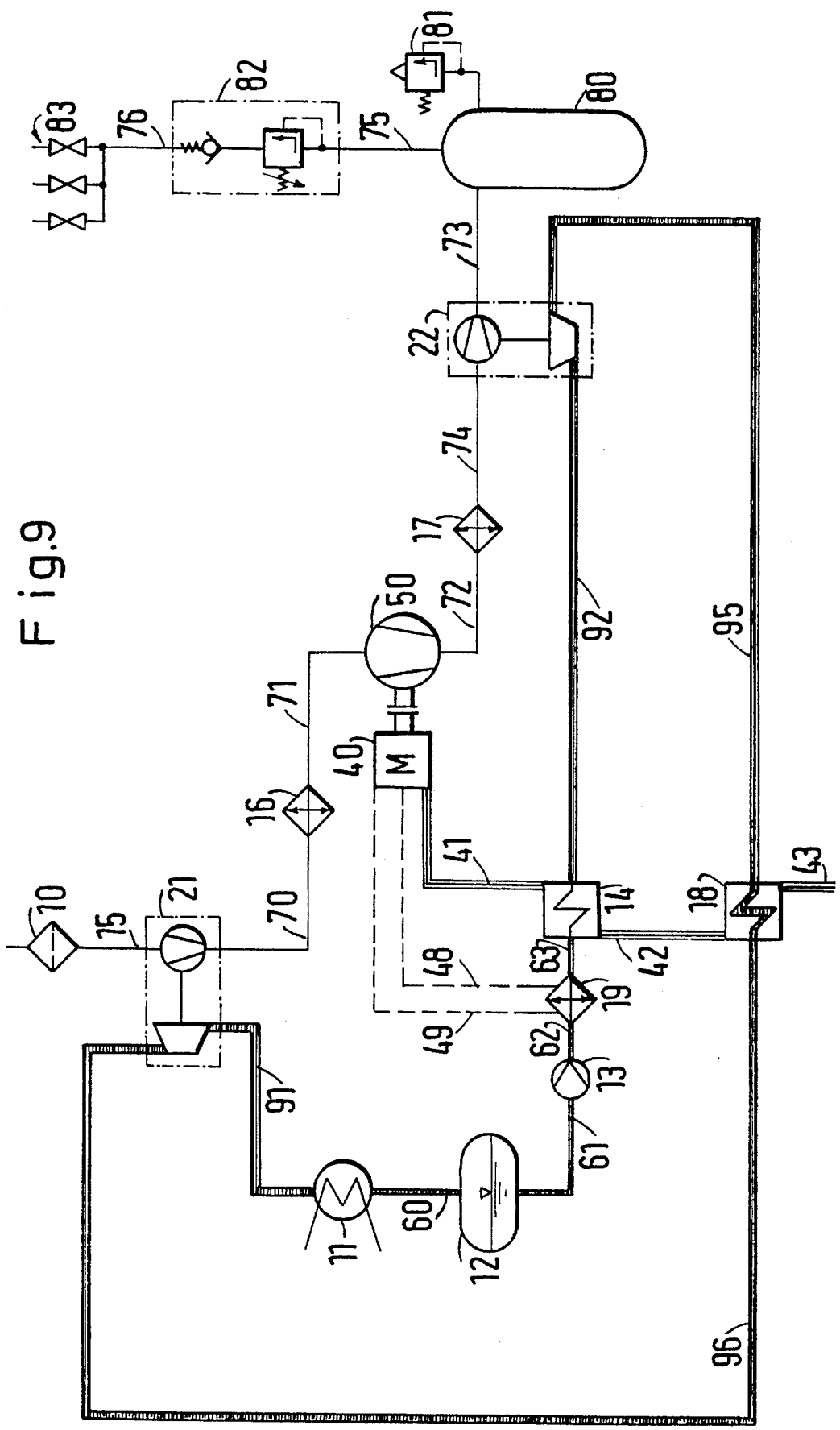
FIG. 9 shows a compressor installation as in FIG. 8, but with the addition of a heat exchanger.

In another construction of the invention according to the view in FIG. 9, the waste heat of the oil and/or coolant circulation of the thermal engine 40 is exploited in addition to the exhaust gas heat. This is suggested in the drawing by the heated oil or cooling water which is fed via the line 48, shown in dashes, from the thermal engine 40 to a heat exchanger 19 arranged between the feed-water pump 13 and the evaporator 14. After passing through the heat exchanger 19, the cooled oil or water is returned to the thermal engine 40 via the line 49, likewise shown in dashes. This arrangement has the advantage that both the oil cooling means and the cooling means for the cooling water can have a small construction design, since a portion of the stored heat is guided off from the heat exchanger 19. The supply of heat simultaneously results in a preheating of the water under pressure and accordingly to a thermally improved circulation.

Figure 10:
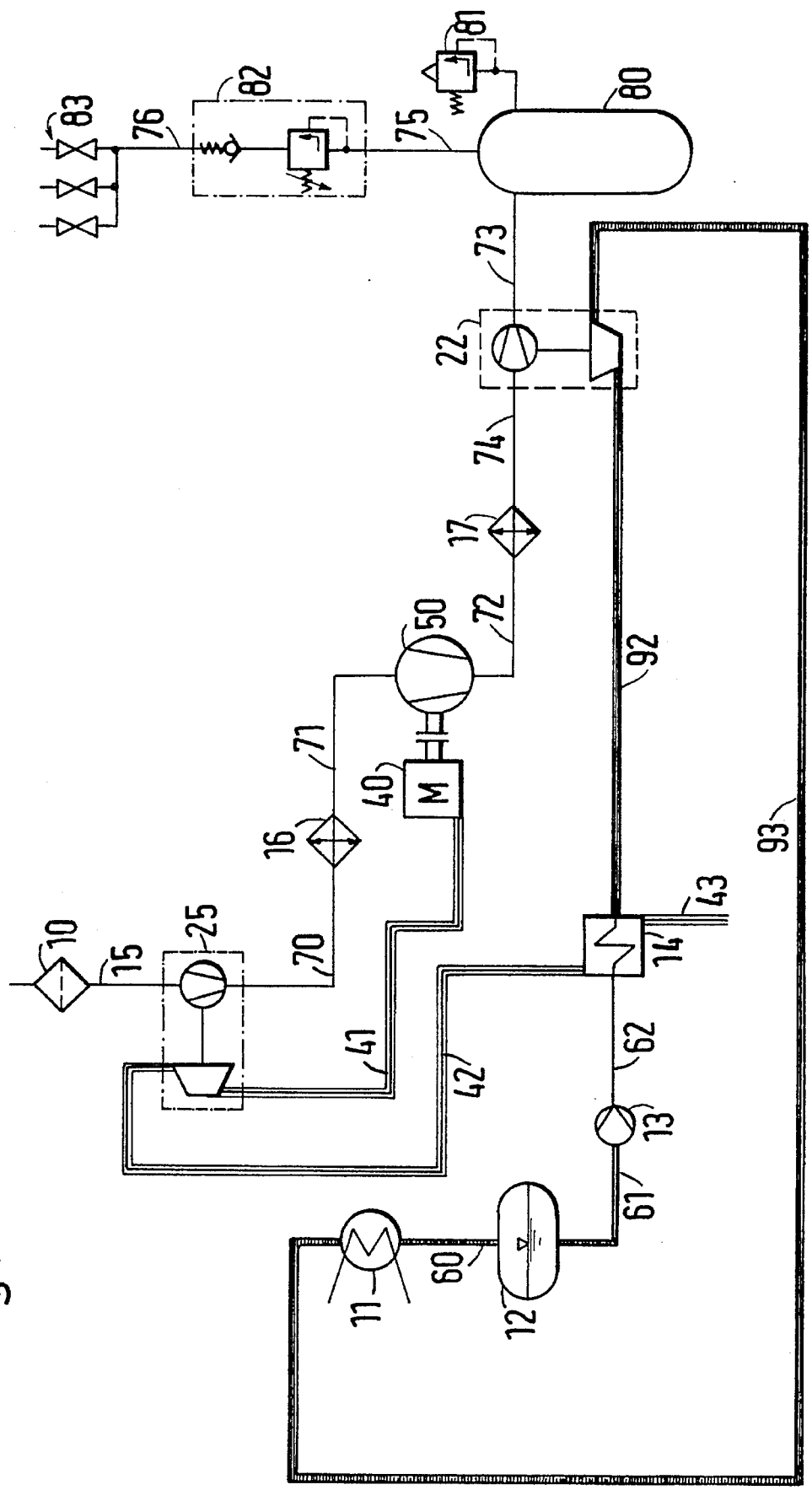
FIG. 10 shows a compressor installation with an exhaust gas turbocharger as pre-compressor and a steam turbocharger as re-compressor and two incorporated intermediate condensers.

FIG. 10 shows another construction of the invention in which the use, already known per se, of an exhaust gas turbocharger is combined with a steam turbocharger according to the invention. For this purpose, the turbine side of the exhaust gas turbocharger 25 is acted upon first via the exhaust gas line 41 and then the evaporator 14 of the closed liquid/steam circulation system is acted upon via the outgoing line 42. This sequence can also be reversed, i.e. in that the evaporator 14 is acted upon first and then the turbine side of the exhaust gas turbocharger 25. Whether the exhaust gas turbocharger 25 is arranged as a pre-compressing unit or as a re-compressing unit is not important. Both arrangements have the advantage that the stored kinetic energy as well as the thermal energy of the exhaust gas flow are used extensively.

The invention is not limited by the embodiments described above which are presented as examples only but can be modified in various ways within the scope of protection defined by the appended patent claims.

I claim:

1. A process for compressing a gaseous medium, comprising the steps of:

providing a compressor;

driving the compressor with a thermal engine arranged and adapted to drive the compressor, the thermal engine having an exhaust gas flow;

sucking gas of a lower initial pressure into the compressor;

compressing the gas in the compressor to a higher predetermined final pressure;

compressing the gas with a steam turbocharger which has a drive side that is acted upon by energy contained in the exhaust gas flow of the thermal engine;

evaporating into steam a pressurized liquid of a liquid/steam circulation system with the exhaust gas flow of the thermal engine; and feeding the steam to the drive side of the turbocharger.

2. A process according to claim 1, including utilizing a plurality of turbochargers, the steam feeding step including dividing the steam into a plurality of partial flows and feeding the partial flows in each instance to the drive side of the plurality of turbochargers.

3. A process according to claim 2, including selectively turning a partial flow on and off as a bypass.

4. A process according to claim 1, wherein the feeding step includes successively feeding the steam to the drive side of a plurality of turbochargers.

5. A process according to claim 4, including reheating the steam flow with the exhaust gas flow of the thermal engine after exiting the drive side of a preceding turbocharger and before entering the drive side of a following turbocharger, the exhaust gas flow being used first for evaporating and then for intermediate heating.

6. A process according to claim 4, including reheating the steam with the exhaust gas flow of the thermal engine after exiting the drive side of a preceding turbocharger and before entering the drive side of a following turbocharger, the exhaust gas flow being used first for intermediate heating and then for evaporating.

7. A process according to claim 4, wherein the dividing step includes dividing the exhaust gas flow before it acts on the liquid/steam circulation system and using one of the partial flows for evaporation and another one of the partial flows for intermediate heating.

8. A process according to claim 1, including providing an exhaust gas turbocharger and first acting directly upon the drive side of the exhaust gas turbocharger with the exhaust gas flow of the thermal engine, and then heating the liquid in the liquid/steam circulation system with the exhaust gas flow exiting the exhaust gas turbocharger.

9. A process according to claim 1, including providing an exhaust gas turbocharger and first using the exhaust gas flow for evaporating the liquid of the liquid/steam circulation system and then acting directly on the drive side of the exhaust gas turbocharger with the exhaust gas flow.

10. A process according to one of claim 1, including preheating the liquid of the liquid/steam circulation system to be evaporated with waste heat of at least one of lubricating oil and cooling water of the thermal engine.

11. A process according to claim 1, wherein the step of compressing the gas with a turbocharger includes precompressing the gas before it enters the compressor.

12. A process according to claim 1, wherein the step of compressing the gas with a turbocharger includes recompressing the compressed gas after it exits the compressor.

* * * * *